Patented May 13, 1952

2,596,200

UNITED STATES PATENT OFFICE 2,596,200

POLYVALENT ALKYLENE IMINE ESTERS AND A PROCESS OF PREPARING THEM

Herbert Bestian, Frankfurt-on-the-Main-Hochst, Germany, assignor to Farbwerke Hoechst vormals Meister Lucius & Bruning, Frankfurt-on-the-Main-Hochst, Germany, a manufacturing and trading organization under the laws of the Allied Control Council and Allied High Commission of Germany No Drawing. Application May 26, 1949, Serial No. 95,589. In Germany October 1, 1948

13 Claims. (Cl. 260—239)

The present invention relates to polyvalent alkylene imine esters and a process of preparing them.

I have found that new polyvalent $\alpha,\beta$-alkylene imine compounds may be obtained by addition of $\alpha,\beta$-alkylene imines to $\alpha,\beta$-olefine carboxylic acid esters of polyhydric alcohols.

Suitable $\alpha,\beta$-olefine carboxylic acid esters are, for instance, the crotonic acid esters of the following compounds: ethylene glycol, propylene glycol, 1.3- and 1.4-butylene glycol, 1.6-hexamethylene glycol, dihydroxydiethyl ether, dihydroxydiethyl sulfide, glycerol, 1.3.5-hexanetriol, pentaerythrite or the like. Instead of the crotonic acid esters there may also be used the esters of the polyhydric alcohols of the following $\alpha,\beta$-olefine carboxylic acids: acrylic acid, methacrylic acid, tiglic acid, $\beta,\beta$-dimethylacrylic acid, $\alpha$-cyancrotonic acid, sorbic acid, $\alpha$-cyansorbic acid, cinnamic acid or the like.

As $\alpha,\beta$-alkylene imines there may be mentioned, besides ethylene imine:

1.2-propylene imine of the formula

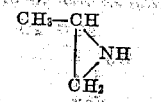

1.2-butylene imine of the formula

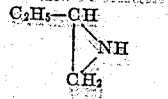

2.3-butylene imine of the formula

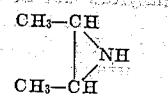

1.1-dimethylethylene imine of the formula

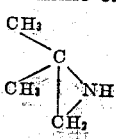

C-butylethylene imine of the formula

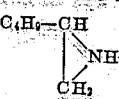

and other 1.2-alkylene imines which, for instance, may be obtained by reaction of C-alkylethanolimine sulfuric acid esters with aqueous solutions of alkaline hydroxides.

According to the reactivity of the olefinic double bonds the addition takes place already at room temperature or it is necessary to heat the components for a shorter or longer time at an elevated temperature. In some cases, the application of solvents or diluents may be advantageous. It is often advisable to effect the addition with an excess of $\alpha,\beta$-alkylene imine which, at the same time, serves as diluent. Thereby, the reaction is terminated more quickly and the excess of alkylene imine may easily be recovered by distilling.

In case of compounds of particularly slow reactivity, the use of catalysts may be of advantage. There enter into question only neutral or alkaline catalysts, for instance, metal salts of saturated or unsaturated carboxylic acids, alcoholates such as sodium methylate, aluminium ethylate, furthermore, sodium amide or the like.

According to the present invention compounds with several functional groups are obtained which correspond to the following general formula:

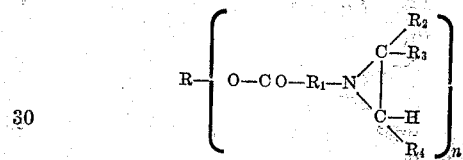

wherein R stands for a polyvalent organic radical, especially for an aliphatic hydrocarbon radical, the carbon chain of which may be interrupted by oxygen or sulfur, $R_1$ stands for a low-molecular aliphatic, araliphatic or isocyclic hydrocarbon radical, $R_2$, $R_3$, and $R_4$ stand for hydrogen or low-molecular alkyl radicals and $n$ is an integer from 2 to 4. The most interesting of these compounds are those with two functional groups which correspond to the formula:

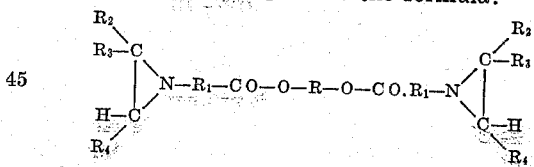

wherein R, $R_1$, $R_2$, $R_3$, and $R_4$ have the above meaning. Compounds the functional groups of which derive from ethylene imine are of particular importance.

The following compounds may be prepared according to this invention: the product obtained by condensation of ethylene imine with the reaction product of crotonic acid and ethylene glycol which corresponds to the following formula:

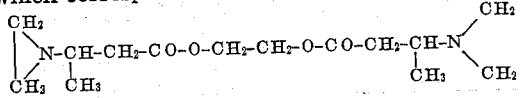

In the above formula, the group

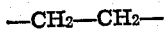

may, for instance, be replaced by $-CH_2-CH_2-CH_2-$ $-CH-CH_2-CH_3$
  $|$
  $CH_3$ $-CH_2-CH_2-CH_2-CH_2-$ $-CH_2-CH_2-CH_2-CH_2-CH_2-CH_2-$ $-CH_2-CH_2-O-CH_2-CH_2-$ $-CH_2-CH_2-S-CH_2-CH_2-$ The group

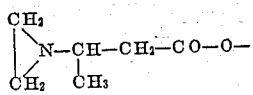

as indicated above, may be replaced, for instance, by

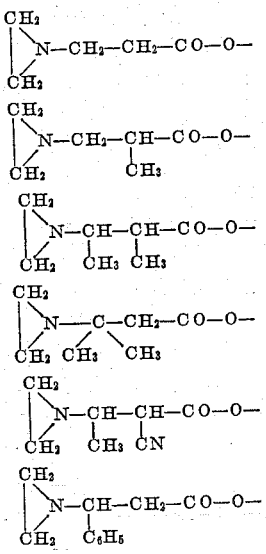

Compounds with 3 or 4 functional groups are derived correspondingly from

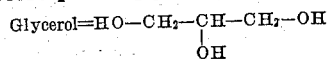

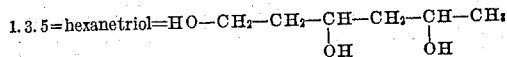

and

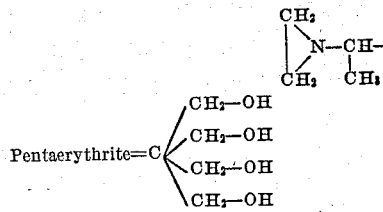

The alkylene imine esters obtainable according to this invention are for the major part oily compounds which are easily soluble in nearly all solvents. It is surprising that in spite of the labile alkylene imine ring they have a high stability which is shown, for instance, by the fact that the may be heated to 200° C. without changing.

The new alkylene imine esters may be used for various purposes, for instance, in the industries of textiles, plastics and varnishes.

The following examples serve to illustrate the invention but they are not intended to limit it thereto, the parts being by weight unless stated otherwise:

(1) 198 parts of acrylic acid 1.3-butylene ester (prepared from 2 mols of acrylic acid chloride and 1 mol of 1.3-butylene glycol) are slowly introduced into 100 parts of ethylene imine, while stirring. By cooling with ice water, care is taken that the reaction heat will be removed. The whole is allowed to stand at room temperature for 24 hours and, subsequently, the bis-β-ethylene imino propionic acid-1.3-butylene ester, obtained with a quantitative yield and corresponding to the following formula:

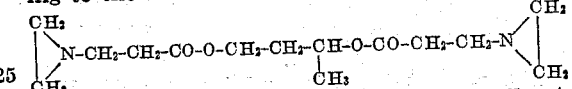

is distilled under reduced pressure. It boils at 153° C. under a mercury pressure of 0.1 mm. The compound is easily soluble in water and the usual solvents.

(2) 198 parts of ethylene biscrotonate (prepared from 2 mols of crotonic acid and 1 mol of ethylene glycol) and 86 parts of ethylene imine are mixed intimately. The temperature rises nearly up to the boiling point. As soon as the heat tune decreases, the mixture is heated at 100° C. for 24 hours. Except for a small part, the ethylene imine has been fixed to the crotonic acid ester. The bis-β-ethylene imino butyric acid ethylene ester obtained which corresponds to the following formula:

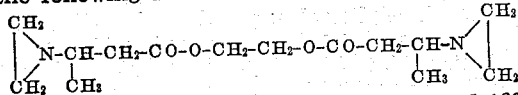

boils at a temperature between 150° C. and 160° C. under a mercury pressure 0.5 mm.

(3) 452 parts of 1.4-butylene biscrotonate (prepared from 2 mols of crotonic acid and 1 mol of 1.4-butylene glycol) and 258 parts of ethylene imine are intimately mixed. 2 parts of sodium methylate are added and the whole is heated under reflux 75° C. for 48 hours on the water-bath. By a suitable closing device the carbonic acid of the air is excluded from the reaction mixture. When the heating on the water-bath is terminated, a test portion must be miscible with water to a clear solution. This being the case, the excess of ethylene imine is distilled off and the ethylene imine ester which has been formed is distilled under reduced pressure. The bis-β-ethylene imino butyric acid 1.4-butylene ester of the formula

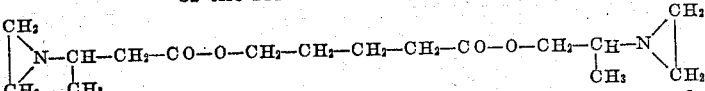

distils over at between 162° C. and 165° C. under a mercury pressure of 0.2 mm.; it is obtained with a nearly quantitative yield as a colorless liquid which crystallizes on standing for a prolonged period of time; the crystallization may be accelerated by the introduction of a crystal nucleus.

(4) While stirring and cooling, 172 parts of ethylene imine are caused to run into 296 parts of glycerol crotonate (prepared from 1 mol of glycerol and 3 mols of crotonic acid). The whole

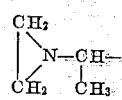

is allowed to stand for 24 hours at room temperature and the excess of ethylene imine is distilled off. The triethylene imine ester thus obtained which corresponds to the formula:

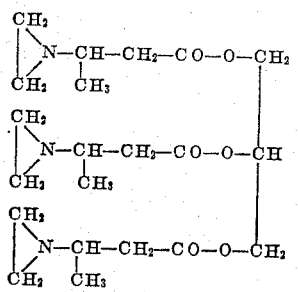

is a nearly colorless oily liquid which is miscible with water to a clear solution and which may be distilled under a mercury pressure of 0.1 mm. at 200° C.–210° C. without noteworthy decomposition.

(5) 99 parts of glycol-biscrotonate and 63 parts of 1.2-propylene imine are heated for 48 hours at 80° C. with exclusion of the carbonic acid of the air. A test portion taken from the mixture easily dissolves in water to a solution of milky turbidity. The small excess of propylene imine is separated by evaporation under reduced pressure and the faintly yellow crude product is distilled under sufficiently reduced pressure. The bis-($\beta$-propylene imino-butyric acid)-glycol ester of the formula:

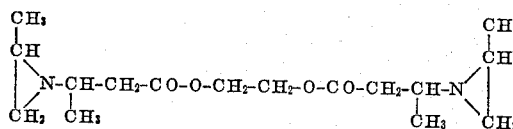

boils at between 140° C. and 143° C. under a pressure of 0.1 mm. mercury. It constitutes a color-

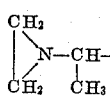

less oily compound which is easily soluble in cold water. Even by feebly heating the aqueous solution, the compound separates in the form of an oil but, on cooling, dissolves again to a clear solution. It is remarkable that the reaction of the aqueous solution, as with all these compounds, is alkaline to delta paper and not alkaline to phenolphthalein.

(6) 242 parts of diethylene glycol-biscrotonate, prepared by esterification of $\beta,\beta'$-dihydroxydiethylether and crotonic acid, are intimately mixed with 129 parts of ethylene imine and the whole is heated for 24 hours at 70° C.–80° C. When the reaction is performed in an apparatus without over-pressure, a suitable closing device must be provided which prevents the carbonic acid of the air from entering into the reaction mixture. When a test portion taken from the mixture is soluble in cold water or dilute hydrochloric acid to a clear solution, the addition of ethylene imine is finished. The excess of ethylene imine is recovered by distilling. The bis-($\beta$-ethylene imino butyric acid)-diglycol ester of the formula:

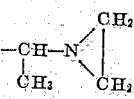

a feebly yellow oil, is obtained with an excellent yield and in a very pure state.

I claim:

1. The process which comprises reacting ethylene imine with ethylene-bis-crotonate.

2. The process which comprises reacting ethylene imine with 1,4-butylene-bis-crotonate.

3. The process which comprises reacting ethylene imine with diethylene glycol-bis-crotonate.

4. The products of the general formula

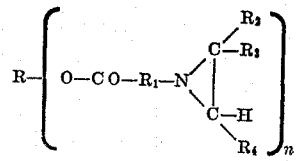

wherein R stands for a radical having from 2 to 4 valences selected from the group consisting of polyvalent aliphatic hydrocarbon radicals, polyvalent aliphatic hydrocarbon radicals the chain of which is interrupted by oxygen and polyvalent aliphatic hydrocarbon radicals the chain of which is interrupted by sulfur, $R_1$ stands for a low molecular aliphatic hydrocarbon radical, $R_2$, $R_3$, $R_4$ stand for members of the group consisting of hydrogen and low molecular alkyl radicals, and $n$ means an integer ranging from 2 to 4.

5. The compound of the formula

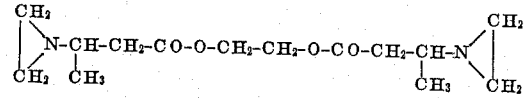

6. The compound of the formula

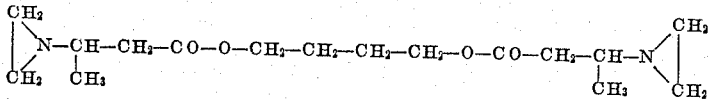

7. The compound of the formula

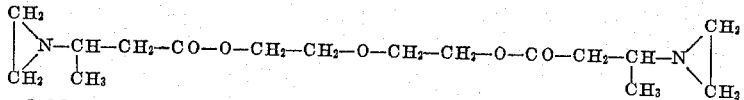

8. The process which comprises reacting an $\alpha,\beta$-alkylenimine with an ester of a low molecular aliphatic hydrocarbon mono-carboxylic acid containing an olefinic bond in $\alpha,\beta$-position and an alcohol having from 2 to 4 hydroxy groups selected from the group consisting of polyvalent aliphatic hydrocarbon alcohols, polyvalent aliphatic hydrocarbon alcohols whose carbon chain is interrupted by oxygen and polyvalent aliphatic hydrocarbon alcohols whose carbon chain is interrupted by sulfur.

9. The products as claimed in claim 4, wherein R stands for a divalent lower alkylene radical, $R_2$, $R_3$, $R_4$ each stand for hydrogen, and $n=2$.

10. The products as claimed in claim 4, wherein R stands for a divalent lower alkylene radical, $R_1$ stands for an isopropylene group, $R_2$, $R_3$, $R_4$ each stand for hydrogen, and $n=2$.

11. The process as claimed in claim 8 wherein the alcohol is a divalent lower alkylene alcohol.

12. The process as claimed in claim 8 wherein the α,β-alkylenimine is ethylene imine and the alcohol is a divalent lower alkylene alcohol.

13. The process as claimed in claim 8 wherein the aliphatic mono-carboxylic acid is crotonic acid, the α,β-alkylenimine is ethylene imine and the alcohol is a divalent lower alkylene alcohol.

HERBERT BESTIAN.

REFERENCES CITED

The following references are of record in the file of this patent:

UNITED STATES PATENTS

| Number | Name | Date |
|---|---|---|
| 2,222,208 | Ulrich | Nov. 19, 1940 |
| 2,265,416 | Bestian | Dec. 9, 1941 |
| 2,272,489 | Ulrich | Feb. 10, 1942 |
| 2,382,185 | Ulrich | Aug. 14, 1945 |

OTHER REFERENCES

Hackh's Chemical Dictionary by Grant, 3rd ed., 1944, The Blakiston Company, Phila., Pa., p. 333.